United States Patent [19]

Dagan

[11] Patent Number: 5,382,756
[45] Date of Patent: Jan. 17, 1995

[54] ENCAPSULATION CLOSURE FOR CABLES

[76] Inventor: Gideon B. Dagan, 986 Vernon Ave., Venice, Calif. 90291

[21] Appl. No.: 8,343

[22] Filed: Jan. 22, 1993

[51] Int. Cl.⁶ .......................................... H02G 15/113
[52] U.S. Cl. ........................................ 174/92; 29/868; 439/367
[58] Field of Search ................... 174/76, 91, 92, 93; 29/868, 869; 439/271, 272, 367, 371, 936

[56] References Cited

U.S. PATENT DOCUMENTS

| | | | |
|---|---|---|---|
| 297,927 | 4/1884 | Goebel | |
| 1,606,789 | 11/1925 | Hooley | |
| 3,458,649 | 11/1966 | Channell | 174/93 |
| 4,392,014 | 7/1983 | Trumble et al. | 174/92 |
| 4,484,022 | 11/1984 | Eilentropp | 29/869 X |
| 4,647,719 | 3/1987 | Campbell et al. | 174/93 |
| 4,692,564 | 9/1987 | Campbell et al. | 174/76 X |
| 4,818,824 | 4/1989 | Dixit et al. | 174/92 |
| 4,849,580 | 7/1989 | Reuter | 174/76 X |
| 4,859,809 | 8/1989 | Jervis | 174/92 |
| 4,869,683 | 9/1989 | Nelson | 439/367 X |
| 4,933,512 | 6/1990 | Nimiya et al. | 174/92 |
| 4,985,598 | 1/1991 | Bubica et al. | 174/93 |
| 5,111,001 | 5/1992 | Jervis | 174/92 |

FOREIGN PATENT DOCUMENTS

| | | | |
|---|---|---|---|
| 257896 | 3/1988 | European Pat. Off. | 439/367 |
| 266816 | 10/1990 | Japan | 174/92 |

OTHER PUBLICATIONS

"2200UG Closure" Information Brochure, by AT&T Network Systems, 1991.
"Armorcast Buried Closure–Direct Injection (ABC–DI)" Product Bulletin, by 3M Telcomm Products Division, 1988.
"XAGA 1650 Buried Splice Closure" Raychem Systems Practice and Installation Instructions, Issue II, Oct. 1989.
"Kold-N-Klose Encapsulation System: Encapsulation Methods and Installation Procedures for Buried or Aerial Splice Closures", by Thomas and Betts Corporation.
"Pressure Encapsulated Closure" by Communications Technology Corporation.
"2200 Series Closure Installation" by AT&T Technologies, 1984.

*Primary Examiner*—Peter Dungba Vo
*Attorney, Agent, or Firm*—Harris, Kern, Walle & Tinsley

[57] ABSTRACT

An enclosure for a cable splice having a sealing compound inside a wrap, and including a housing for positioning around the splice, a plurality of presser arms in the housing positioned between the housing and the splice, with each of the arms having a boss projecting outward through the housing, and a clamp or strap or the like for engaging the bosses and pressing them regularly inward to apply pressure to the sealing compound by the presser arms engaging the wrap.

15 Claims, 4 Drawing Sheets

ENCAPSULATION CLOSURE FOR CABLES

BACKGROUND OF THE INVENTION

This invention relates to enclosures for cable splices for mechanical protection of the splice and for providing a barrier against water and moisture intrusion into the splice.

A variety of enclosures for cable splices are presently in use, including electrical and optical cables with a plurality of conductors. After the conductor interconnections are completed and the appropriate insulation or other protection has been applied, a housing is positioned around the splice with some form of sealing compound in the housing. The sealing compound usually is a gel which functions to reduce penetration of moisture into the splice. The housing itself provides mechanical protection for the splice and is normally designed to be removable for reentering the splice.

In one type of enclosure, the housing is partially filled with the sealing compound before it is positioned around the splice. Some form of end seal is provided to close the open ends of the housing around the cables which extend from each end of the splice. In another type of enclosure, an opening is provided in the wall of the housing for pouring the sealing compound into the interior of the housing after it is positioned around the splice. This type of construction, usually referred to as gravity encapsulation, tends to leave many openings and paths in the sealing compound through which moisture can penetrate.

In another type of encapsulation, a bag or wrap of some nature is positioned around the splice and filled with a sealing compound by pouring or the like. Then the encapsulated splice is tightly wrapped with overlapping turns of tape to apply pressure to the sealing compound within the bag to force the sealing compound into the interstices to provide a more effective barrier against moisture. While this type of encapsulation is reasonably effective, it is not easy to install, requiring considerable time and considerable skill to achieve a highly moisture-resistant closure.

Another approach for a quality encapsulation is to utilize a caulking gun or the like for injection of sealing compound into the interior of the housing after it is positioned around the splice with the end seals in place. With this system, considerable pressure can be exerted on the sealing compound to urge the compound into the various spaces. However, this method requires an extra tool and space for operating the tool.

The current designs for cable splice enclosures are shown in greater detail in the publications of the manufacturers, including AT&T, 3M, Raychem, Thomas & Betts and Communications Technology Corporation.

SUMMARY OF THE INVENTION

It is an object of the present invention to provide a new and improved enclosure for a cable splice which provides compression of the sealing compound for forcing the compound into all the cavities and crevices within the housing and into the core of the cable. Another object is to provide such an enclosure which can be installed without requiring special tools or heating or wrapping. An additional object is to provide such an enclosure which is simple, easy and quick to install without requiring any high level of skill or extensive practice to achieve quality sealing.

It is a further object of the invention to provide such an enclosure which is suitable for buried cable and which utilizes a durable housing providing mechanical protection while at the same time being easily opened for reentry of the cable splice.

In its preferred form, the enclosure of the invention includes a housing for positioning around the splice with a plurality of presser arms carried in the housing and positioned between the housing and the splice. Bosses are provided on the presser arms projecting through the housing for engagement with a compression member, typically a band or tape passing through slots in the bosses so that when the tape is tightened, the presser arms are urged inward to engage the wrap, moving the compound into the various cavities.

Preferably, the presser arms are arcuate in cross section and extend along the length of the splice, typically with three or four such arms shaped so as to substantially surround the splice when the arms are compressed inward. The housing may be formed as a one-piece molding with appropriate hinges for positioning around the splice or may be formed of two pieces with connecting flanges. Seals of some form are provided for closing the ends of the housing around the cables, and mechanical supports for the cables within the housing may be utilized, with the end seals and mechanical supports being conventional in design.

Other objects, advantages, features and results will more fully appear in the course of the following description.

DESCRIPTION OF THE PREFERRED EMBODIMENTS

Figure 1:
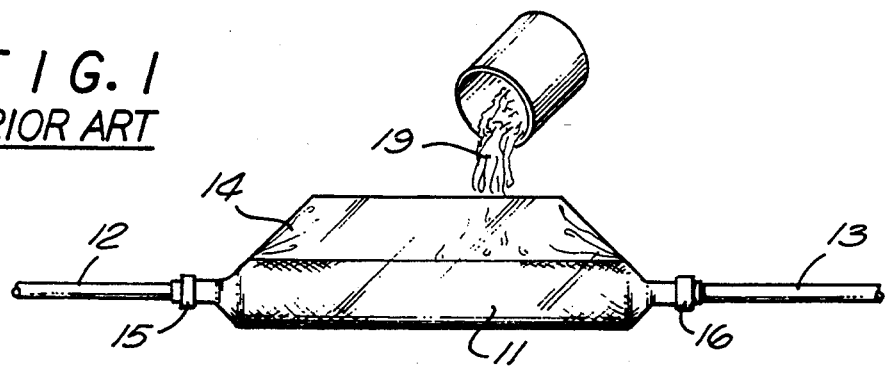
FIG. 1 is a side view of a cable splice with a wrap being filled with a sealing compound.

A conventional splice 11 of cables 12, 13 is shown in FIG. 1. After the interconnections of the various conductors of the cables have been completed and appropriately insulated, a wrap 14, typically a flexible plastic, is applied around the splice. The edges of the wrap are tightly bound around the cables in the conventional manner at 15, 16. A sealing compound 19 is poured into the interior of the wrap 14 through an open mouth, after which the open mouth is closed, as by an adhesive and/or folding over at 20. The closed mouth may be held in place by an adhesive tape or loosely tied with a string or with cable ties.

Figure 2:
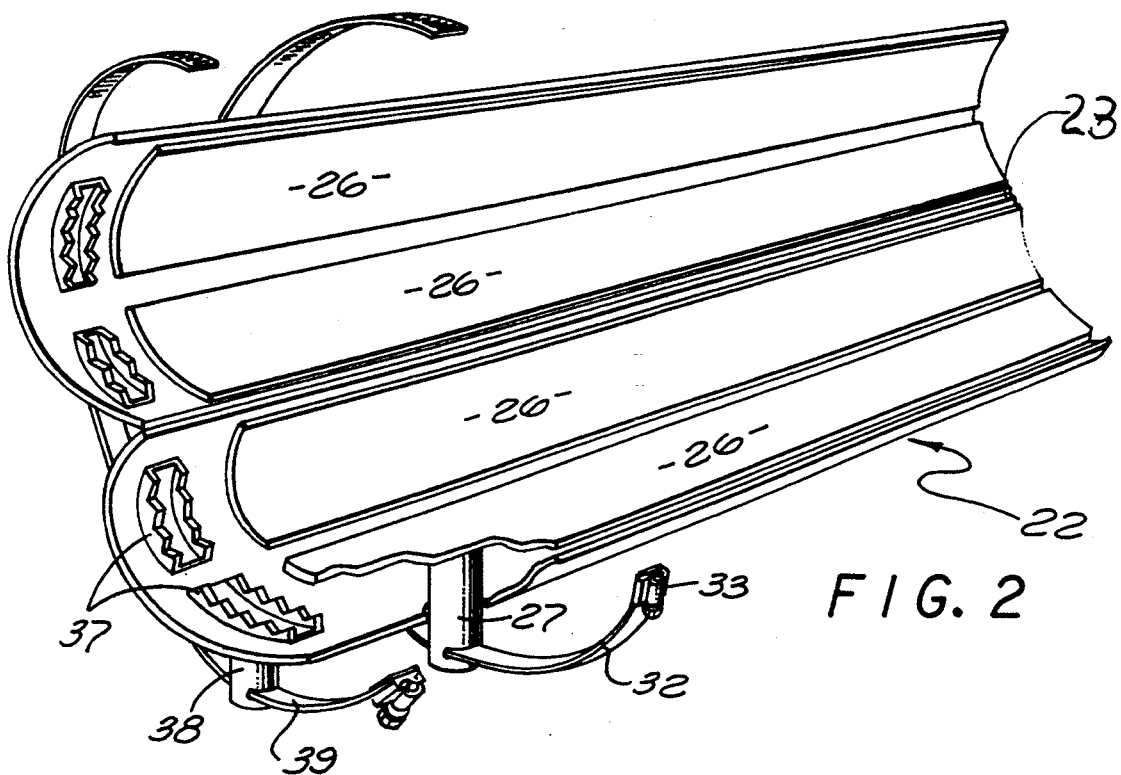
FIG. 2 is a perspective view of a housing for positioning around the splice and incorporating the presently preferred embodiment of the invention.
Figure 3:
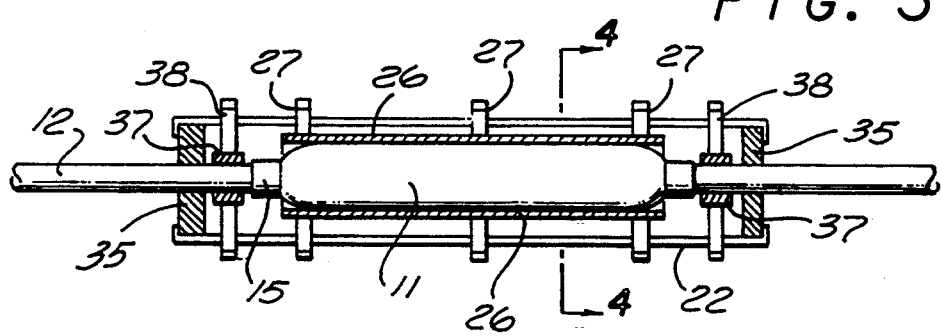
FIG. 3 is a view similar to that of FIG. 1 with the housing of FIG. 2 in place.
Figure 4:
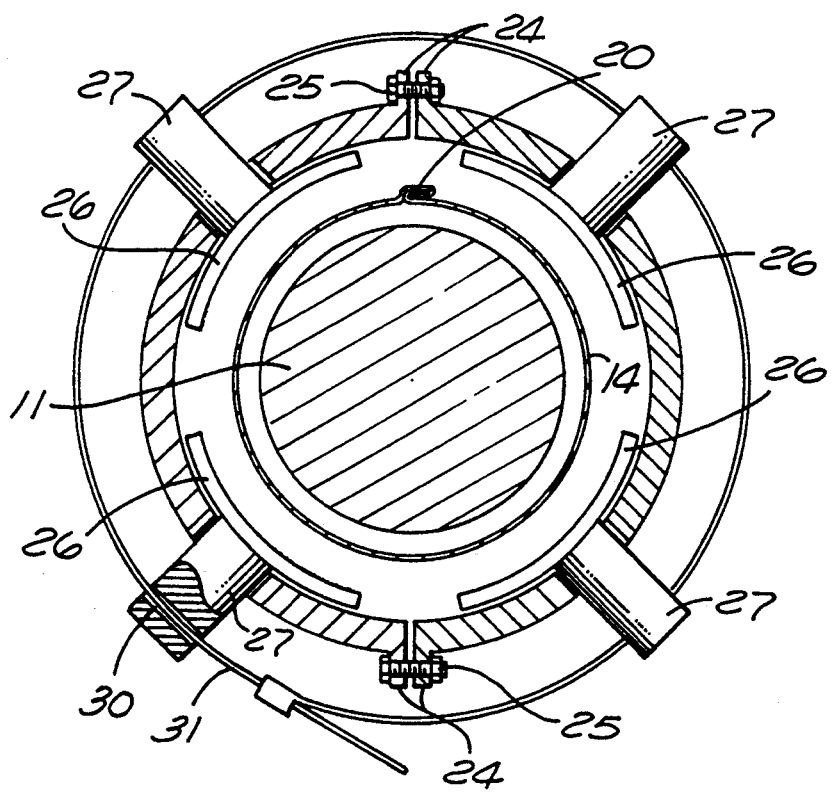
FIG. 4 is an enlarged sectional view taken along the line 4—4 of FIG. 3.
Figure 5:
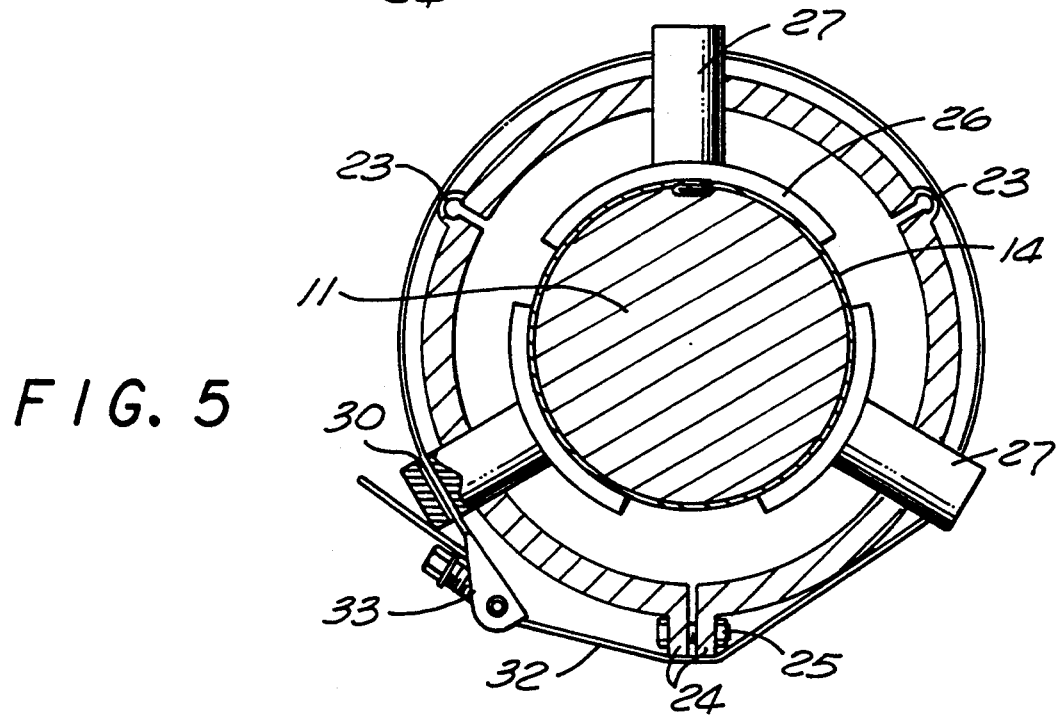
FIG. 5 is a sectional view similar to that of FIG. 4 showing an alternative embodiment of the invention.

Next a housing 22 is positioned around the splice to produce the structure shown in FIG. 3. The housing 22 is shown in greater detail in FIG. 2 and typically comprises two segments which may be joined by a flexible hinge 23 as shown in FIG. 2 and FIG. 5, or may be formed separately with flanges 24 for joining with bolts and nuts or other form of fasteners 25 as shown in FIG. 4. Alternatively, the housing may be made in three or more segments, as desired.

In the embodiment shown in FIGS. 1-4, four presser arms 26 are positioned inside the housing, with each presser arm having one or more bosses 27 projecting outward through openings in the housing. While cylindrical bosses are illustrated, the shape of the boss is not critical and bosses with square cross-sections or other shapes may be used. Three bosses per presser are shown in the drawing figures. Preferably the presser arms are arcuate in cross section as shown in the drawing figures, and extend substantially along the length of the splice. The presser arms with bosses and the housing segments typically are molded of a relatively rigid plastic, but may be made of metal if preferred.

Means are provided for applying inward pressure to the presser arms via the bosses. In the specific embodiment illustrated, slots 30 are provided through the bosses near the outer ends, and a cable tie 31 is threaded through the corresponding bosses of the four presser arms. The cable tie is then pulled tight in the conventional manner, urging the pressure arms inward against the wrap of the splice to apply a compression force to the sealing compound and move the compound into the various spaces within the splice.

In an alternative arrangement, a metal band or hose clamp 32 with screw-type connector 33 is used to apply the compression force. The cable tie configuration is shown in FIG. 4 and the hose clamp is shown in FIGS. 2 and 5. The embodiment of FIG. 5 utilizes three pressure arms, in contrast to the four arms shown in the embodiment of FIG. 4. Of course, a structure with only two presser arms, or more than four, could be utilized if desired.

Figure 6:
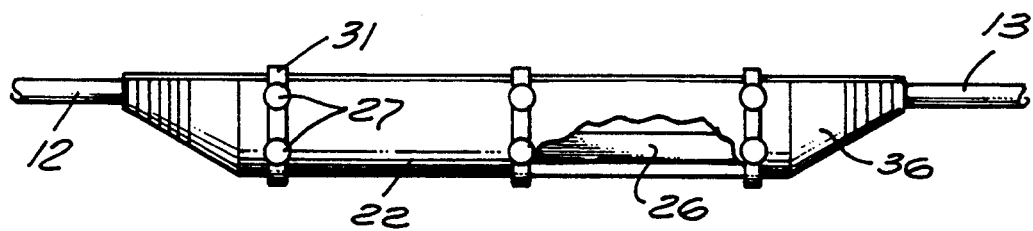
FIG. 6 is a view similar to that of FIG. 3 showing an alternative form of end seal.

In the embodiment illustrated in FIG. 3, seals 35 are positioned at the each end of the housing to provide a seal around the cables. In the embodiment illustrated in FIG. 6, a different form of seal 36 is utilized. These end seals are conventional in nature. Typically, the cone-like seal 36 is formed as part of the housing 22.

Also, it is preferred to provide some form of mechanical support adjacent each end of the splice to provide cable strain relief, and this support may also be conventional in nature. However, the embodiment illustrated in FIGS. 2 and 3 is preferred. Cable engaging members 37 with bosses 38 are positioned in the housing and are clamped in place by clamping members 39. The various forms of boss and clamping members used with the presser arms may be used here also. With this novel arrangement, there is no need to adjust the cable engaging members to the diameter of the cable prior to installation, as required in the prior art. With the present design, the positioning of the members 37 occurs automatically as the clamping member is tightened.

Figure 7:
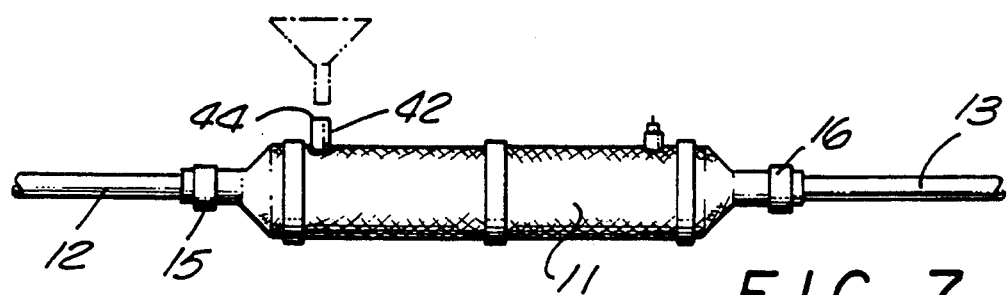
FIG. 7 is a view similar to that of FIG. 1 showing an alternative form of cable splice using a spout for introducing the sealing compound.
Figure 8:
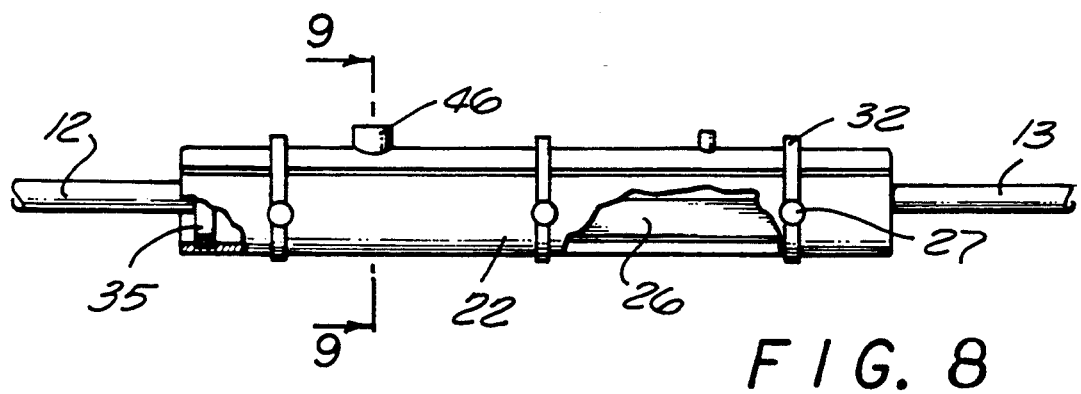
FIG. 8 is a view of the splice of FIG. 7 with a housing in place.
Figure 9:
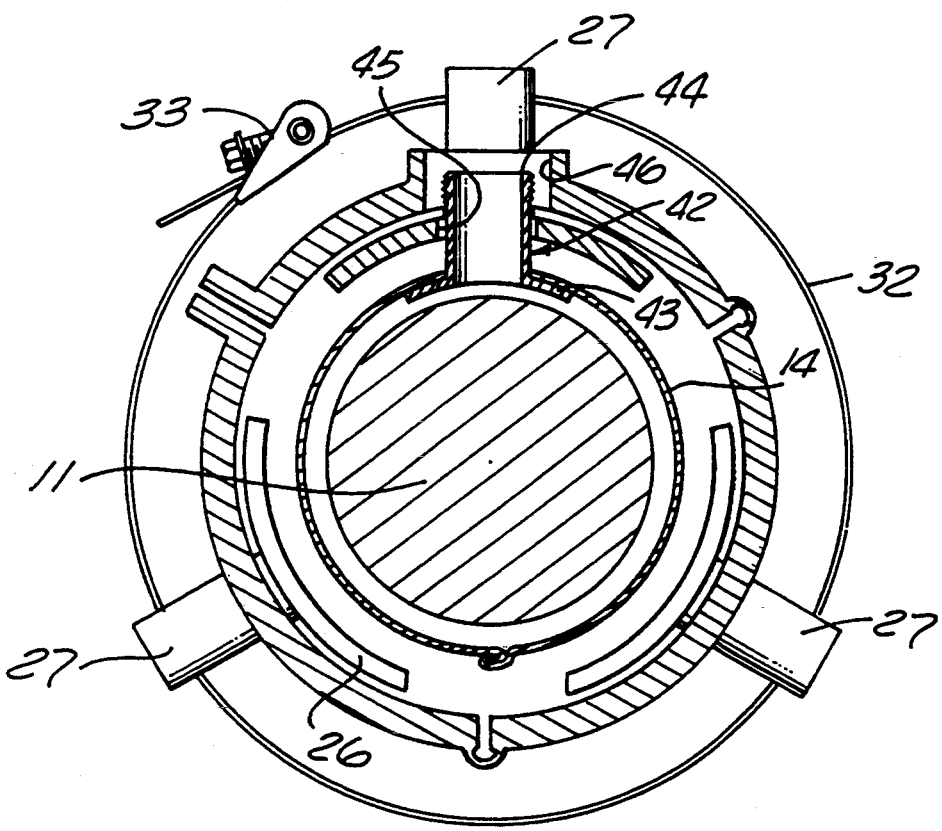
FIG. 9 is an enlarged sectional view taken along the line 9—9 of FIG. 8.

Another alternative embodiment of the invention is shown in FIGS. 7-9 with a provision for introducing the sealing compound into the splice under the wrap before or after the housing is positioned around the splice. A spout 42 has a flange 43 positioned under the wrap 14, with an outer end 44 of the spout projecting outward. One of the presser arms is provided with an opening 45 for the spout, and a corresponding opening 46 is provided in the housing providing access to the spout from the exterior of the housing.

In this arrangement, before or after the housing is in position but before the compression clamping members have been tightened, the sealing compound is introduced under the wrap around the splice. This may be done by pouring, but does not require any pressure by a caulking gun or the like. After the desired quantity of sealing compound has been introduced, the spout may be closed by a threaded cap or the like.

Then the clamping members are tightened to apply compression forces to the sealing compound around the splice, as with the previously described embodiments.

Figure 10:
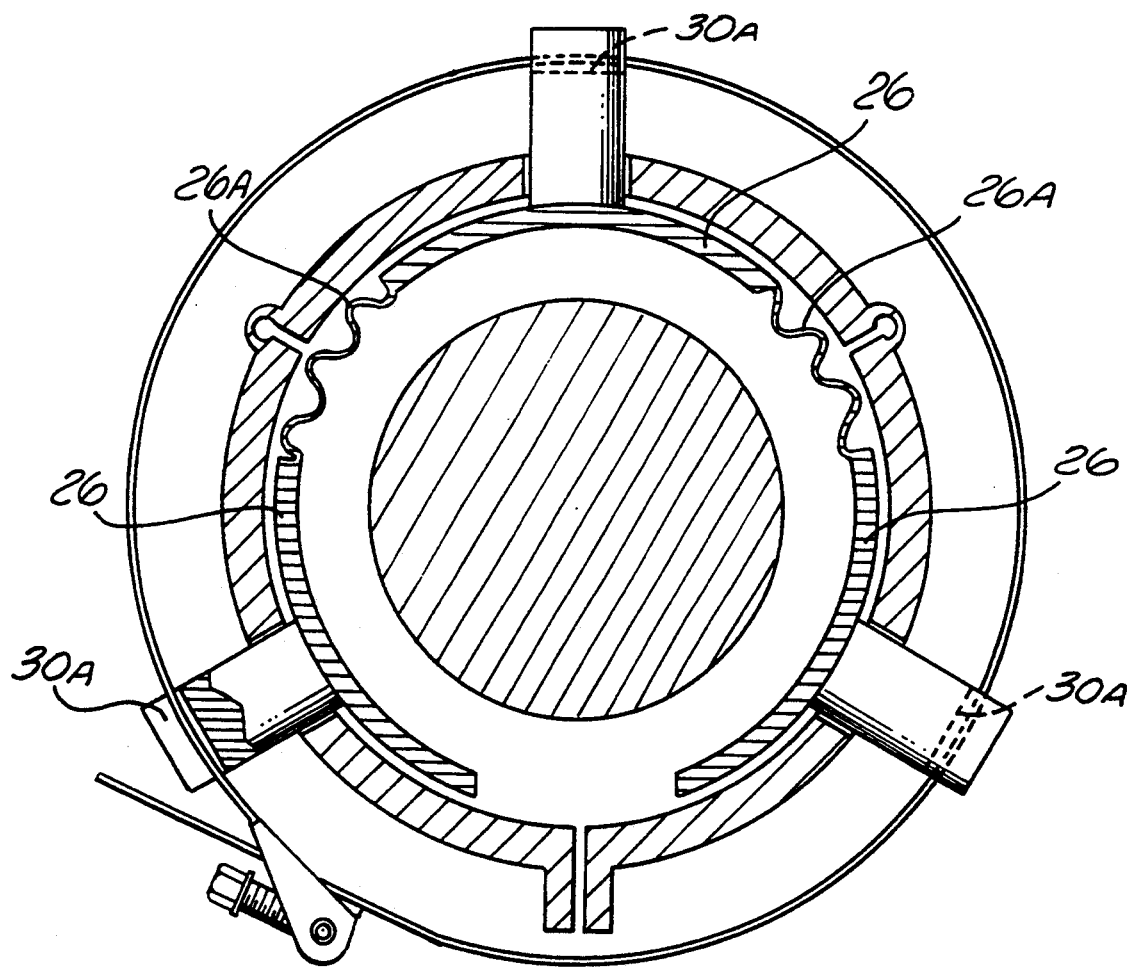
FIG. 10 is a sectional view similar to that of FIGS. 4 and 5 showing another embodiment of the invention.

In the alternative embodiment of FIG. 10, the presser arms 26 are molded as a single piece, with the arms joined by thinner, flexible, accordion-like sections 26A. Also the bosses 27 have slots or grooves 30A rather than the slots 30 shown in FIG. 4, as passages for the compression bands or ties.

As the clamping members 31, 32 are tightened, the free floating presser arms 26 and cable engaging members 37 are moved inwardly separately and are automatically positioned to exert uniform pressure on the splice and cables, thereby reducing strain on the assembly while achieving the desired sealing.

I claim:

1. An enclosure for a cable splice having a sealing compound inside a wrap, comprising:
    a housing for positioning around said splice;
    a plurality of presser arms in said housing and positioned between said housing and splice, each of said arms having a boss projecting outward through said housing; and
    compression means engaging said bosses for urging said presser arms inward to engage said wrap and apply pressure to said sealing compound.

2. An enclosure as defined in claim 1 where said presser arms are arcuate and extend along said splice.

3. An enclosure as defined in claim 2 wherein said arcuate presser arms substantially surround said splice when compressed by said compression means.

4. An enclosure as defined in claim 2 having three of said presser arms.

5. An enclosure as defined in claim 2 having four of said presser arms.

6. An enclosure as defined in claim 2 wherein each of said presser arms has a plurality of bosses therealong, each of said bosses of said presser arms having a corresponding separate compression means.

7. An enclosure as defined in claim 6 wherein each of said bosses has a passage therethrough, and said compression means includes a band for passing through said passages of corresponding bosses around the periphery of said housing, and means for tightening said band.

8. An enclosure as defined in claim 7 wherein said cable splice has at least one cable at each end, and including a seal member for positioning at each end of said housing around the cables.

9. An enclosure as defined in claim 8 wherein said seal means is formed integral with said housing.

10. An enclosure as defined in claim 1 wherein each of said presser arms has a plurality of bosses therealong, each of said bosses of said presser arms having a corresponding separate compression means.

11. An enclosure as defined in claim 10 wherein each of said bosses has a passage therethrough, and said compression means includes a band for passing through said passages of corresponding bosses around the periphery of said housing, and means for tightening said band.

12. An enclosure as defined in claim 1 wherein said splice has a filling spout defining a flow path for sealing compound from an outer end of said spout into the interior of said wrap, and wherein said housing includes means defining an access opening to said spout in a side wall of said housing.

13. An enclosure as defined in claim 1 wherein said housing is formed in a single piece with a plurality of segments hinged together.

14. An enclosure as defined in claim 1 wherein said housing is formed of a plurality of pieces with connecting flanges.

15. An enclosure as defined in claim 1 including a plurality of cable engaging members in said housing adjacent each end of said splice, each of said cable engaging members having a cable boss projecting outward through said housing, and cable boss compressor means engaging said cable bosses at each end of said splice for urging said cable engaging members inward to engage the cables at each end of said splice.

* * * * *